(12) United States Patent
Shuman et al.

(10) Patent No.: US 8,447,324 B2
(45) Date of Patent: May 21, 2013

(54) SYSTEM FOR MULTIMEDIA TAGGING BY A MOBILE USER

(75) Inventors: Mohammed Ataur Shuman, San Diego, CA (US); Yasser Ansari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 12/652,457

(22) Filed: Jan. 5, 2010

(65) Prior Publication Data
US 2011/0165888 A1 Jul. 7, 2011

(51) Int. Cl.
*H04W 24/00* (2009.01)

(52) U.S. Cl.
USPC ............. 455/456.1; 455/456.3; 455/518

(58) Field of Classification Search
None
See application file for complete search history.

(56) References Cited

U.S. PATENT DOCUMENTS

| | | | |
|---|---|---|---|
| 7,353,034 B2* | 4/2008 | Haney | 455/457 |
| 2002/0123327 A1* | 9/2002 | Vataja | 455/412 |
| 2007/0032244 A1* | 2/2007 | Counts et al. | 455/456.1 |
| 2008/0070588 A1* | 3/2008 | Morin | 455/456.1 |
| 2008/0132251 A1* | 6/2008 | Altman et al. | 455/457 |
| 2008/0160966 A1 | 7/2008 | McKiou et al. | |
| 2009/0005079 A1* | 1/2009 | Shields et al. | 455/456.3 |
| 2009/0156233 A1* | 6/2009 | Lin | 455/456.3 |

FOREIGN PATENT DOCUMENTS

| | | |
|---|---|---|
| EP | 1944701 | 7/2008 |
| WO | WO0077662 A2 | 12/2000 |
| WO | WO0217130 A2 | 2/2002 |

OTHER PUBLICATIONS

International Search Report and Written Opinion—PCT/US2011/020255, ISA/EPO—Apr. 26, 2011.

* cited by examiner

*Primary Examiner* — Erika A Washington
(74) *Attorney, Agent, or Firm* — Raphael Freiwirth

(57) ABSTRACT

A system, method, and wireless communication device that provide a mobile user with selective access to information based on a predefined trigger such as a user's vicinity. In an embodiment, selected information from a first wireless communication device of a communication group may be associated with a geographic location and stored. A portion of the information may be selectively transmitted to a second wireless communication device of the communication group when the second wireless communication device is determined to be proximate to the geographic location associated with the information. In one embodiment, the second wireless communication device may receive the information automatically based on trigger settings.

49 Claims, 9 Drawing Sheets

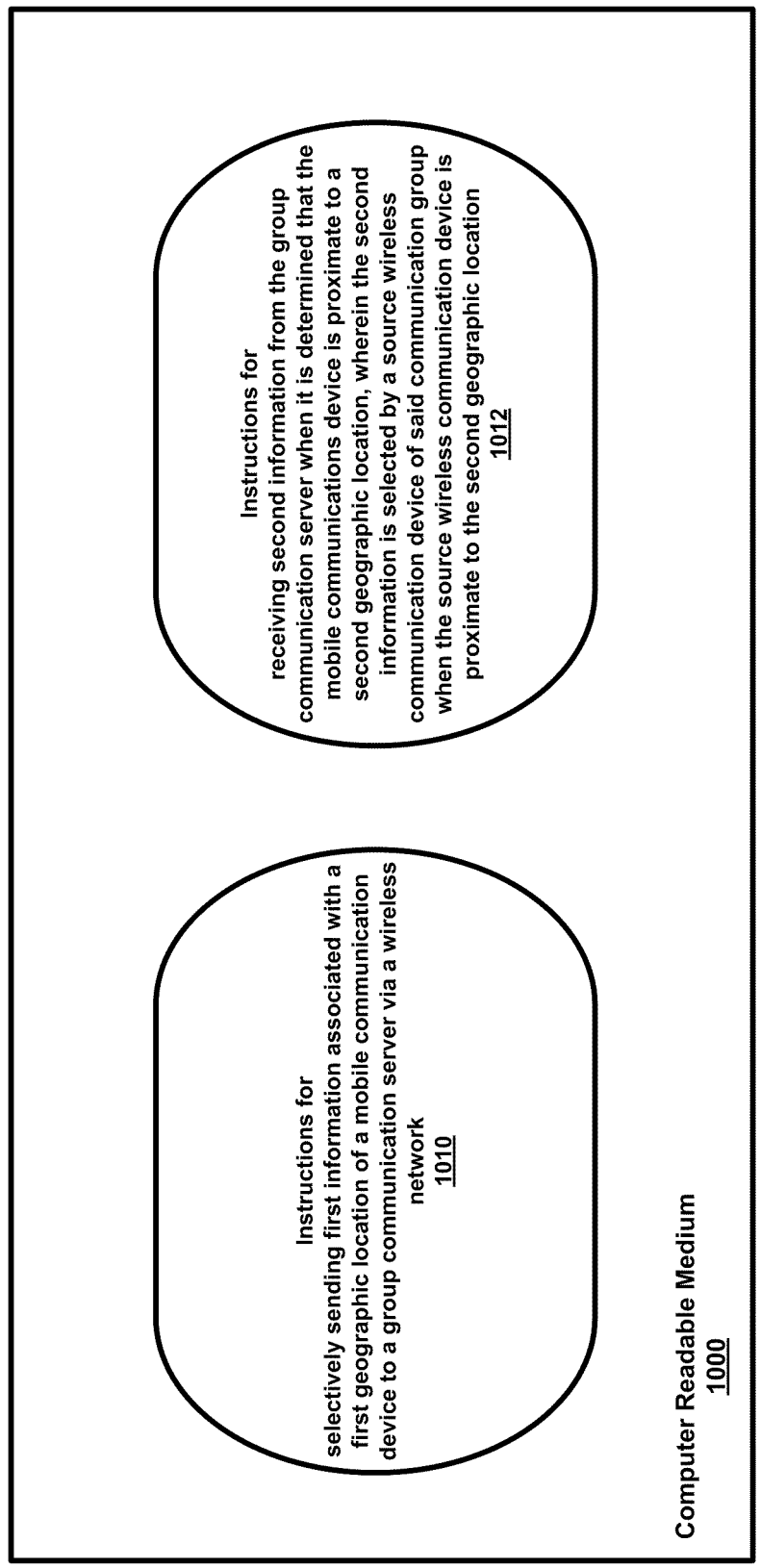

SYSTEM FOR MULTIMEDIA TAGGING BY A MOBILE USER

BACKGROUND

1. Field of the Invention

The present invention relates to the exchange of information using computer devices. More specifically, the present invention relates to systems and methods for creating and sharing location-based information on a wireless telecommunication device.

2. Description of the Related Art

Mobile telecommunication devices, such as cellular phones, PDAs, and mini-laptops, typically receive and transmit various types of information relating to personal contacts, multimedia, and the like. The wide availability of mobile data networks have enabled mobile device users to remain connected to their provider networks and thus all of the data and services available via the Internet and other networks. Such mobile devices typically host a variety of applications such as video and audio applications, image and audio capture devices, and location determination systems such as GPS. The mobile devices may also have access to location based services such as searching and mapping functions.

Users of mobile devices typically have limited resources for providing a real time user interface that is available for quickly and efficiently sharing information with other mobile device users. For example, users must typically page through numerous screens and scroll through numerous menu choices to find the information or application they are looking for. For example, if a user desires to search for an eatery near their current location, the user may search for and launch a browser, perform a yellow pages search, review the search results, and read through user reviews to find a suitable eatery. As another example, the user may desire to record and store comments about the eatery and share their comments with their contacts. However, many mobile devices do not have the resources such as the processing power and memory to maintain a store of relevant media, nor the applications and services to readily store, share, or access such information.

An opportunity thus exists when a mobile device is capable of receiving or transmitting information about its environment and has access to a data network.

SUMMARY

Briefly described, the present invention includes a system, method, and wireless communication device that provides a mobile user with selective access to information based on a predefined trigger such as a user's vicinity. In an embodiment, selected information from a first wireless communication device of a communication group may be associated with a geographic location and stored. A portion of the information may then be selectively transmitted to a second wireless communication device of the communication group when the second wireless communication device is determined to be proximate to the geographic location associated with the information. In one embodiment, the second wireless communication device may receive the information automatically based on trigger settings.

The present system and method are therefore advantageous in that by providing the ability to, for example, create and upload information such as multimedia and make the multimedia available based on a trigger such as a geographic location, mobile users may easily share information regarding points of interest such as landmarks, restaurants, and the like.

Other objects, features, and advantages of the present invention will become apparent after review of the Brief Description of the Drawings, Detailed Description, and the Claims.

BRIEF DESCRIPTION OF THE DRAWINGS

FIG. 10 illustrates a computer readable medium bearing computer executable instructions discussed with respect to FIGS. 1-9.

DETAILED DESCRIPTION OF THE INVENTION

Figure 1:
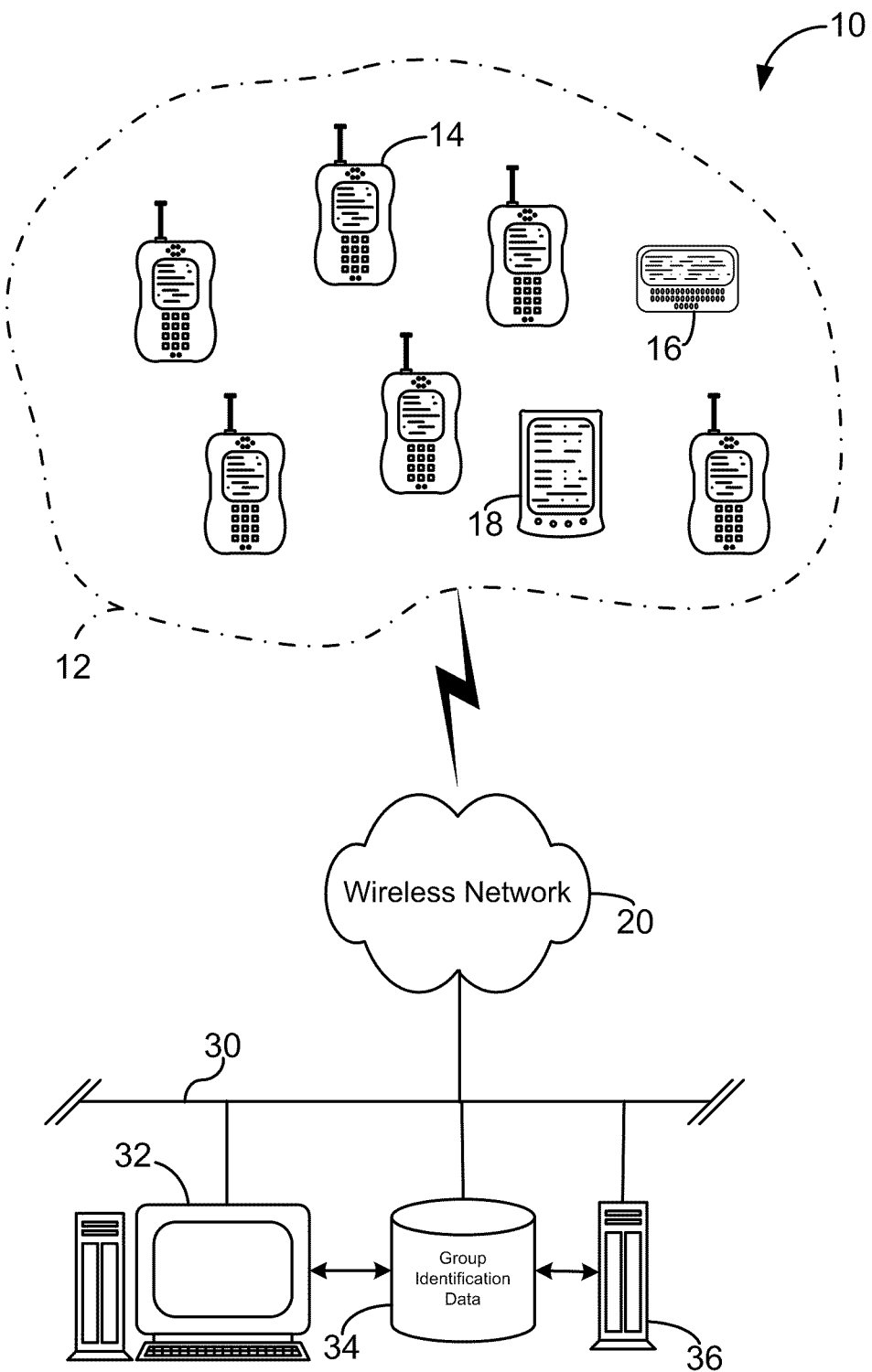
FIG. 1 is a representative diagram of a wireless network with a designated PTT group of wireless telecommunication devices communicating with a group communication server and other computer devices across the wireless network.

In this description, the terms "mobile communication device," "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "group communication" means a point-to-point or point-to-multipoint communication sent between wireless communication devices across true or virtual half-duplex channels. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

With reference to the figures in which like numerals represent like elements throughout, FIG. 1 illustrates one embodiment of the system 10 comprising one or more wireless telecommunication devices. A PTT group 12 may be formed for sharing group media among the one or more wireless telecommunication device. The PTT group may further comprise devices such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) informs the group communication computer device, shown here as server 32, which is present on a server-side LAN 30 across the wireless network 20, that the wireless device is present, i.e. accessible, on the wireless network 20. The group communication computer device 32 can share this information with the set of target wireless telecommunication devices designated by the first wireless telecommunication device, or can share is with other computer devices resident on the server-side LAN 30 or accessible across the wireless network 20. The group communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

In overview, the system 10 includes at least one wireless communication device, such as mobile telephone 14, that is a member of a communication group 12 of wireless communication devices that communicate with each other in direct group communications across a wireless communication network 20, the at least one wireless communication device configured to selectively send group-directed communications to other members of the communication group 12. At least one group communication computer device or server 32 is configured to store information on communication groups 12 on the wireless communication network 20, the information including the identity of the specific member wireless communication devices of one or more communication groups. The group communication computer device 32 is further configured to selectively receive group-directed communications from a sending wireless communication device, such as mobile telephone 14, of a communication group 12 and send the group-directed media to the other member wireless communication devices of the communication group 12 for the sending wireless communication device.

The system 10 can further include a data store 36 in communication with the group communication computer device(s) 32, with the group communication computer device 32 configured to send group-directed media to the data store 36. The data store 36 can configured to receive the group-designated media from a wireless communication device (such as mobile phone 14) and selectively permit members of the communication group 12 for which the group-directed media was sent to access the stored group-directed media across the wireless communication network 20.

The group-directed media can be graphic media, such as pictures in JPEG, TIF, and the like, audio files such as MP3, MP4, WAV, and the like. The media can also be streaming media, such as a multimedia application (Powerpoint, MOV file, and the like). The group-directed media can also be streaming media, or an interactive session on another computer device on the wireless communication network 20, such as a game hosted on data store 36 or private bulletin board. For example, participants in a game can chat via the group-communication about the ongoing game. Also, the group-directed media could be half-duplex video conferencing among members of the communication group wherein the picture of the speaker is broadcast to the other group members in substantial real-time, or in delay.

As is further described herein, the wireless communication device 14,16,18 can be engaged in a group communication with the member wireless communication devices of the communication group 12, and send group-directed media during the group communication in the same communication session, or independently therefrom. Alternately, the group-directed media can be sent independently of the group-communication session.

Figure 2:
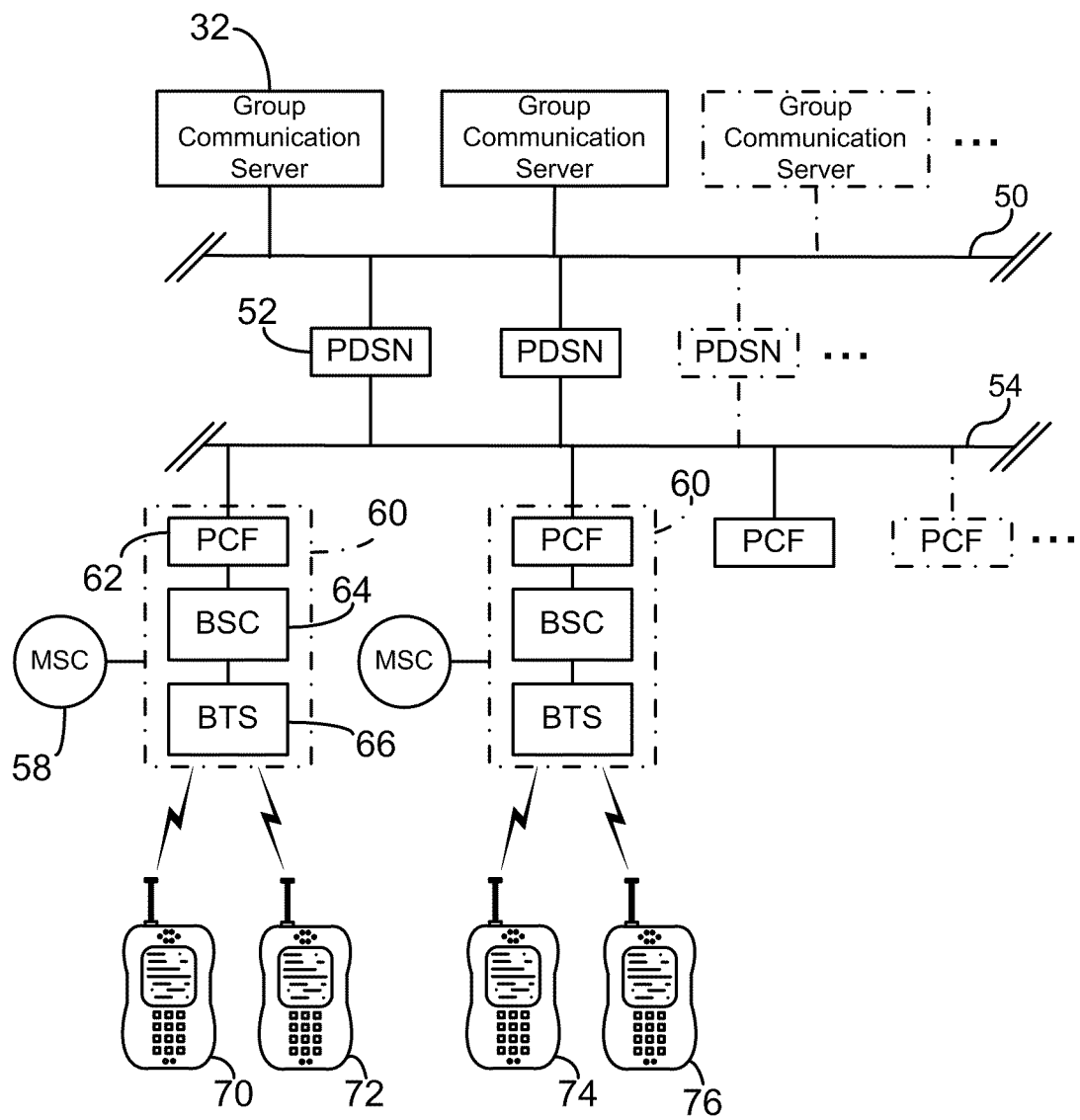
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service providers packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Figure 3:
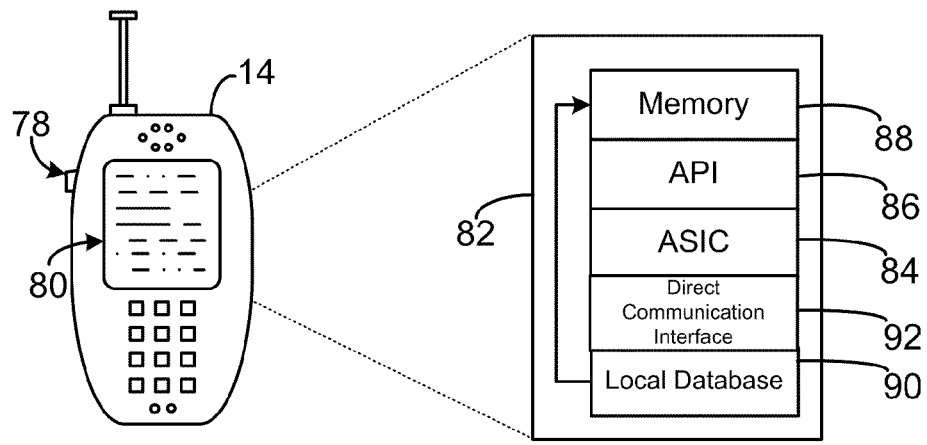
FIG. 3 is a block diagram illustrating the computer platform of the wireless telecommunication device with PTT capability.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or at the control of, the group communication computer device 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open a group communication channel (typically half-duplex) from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
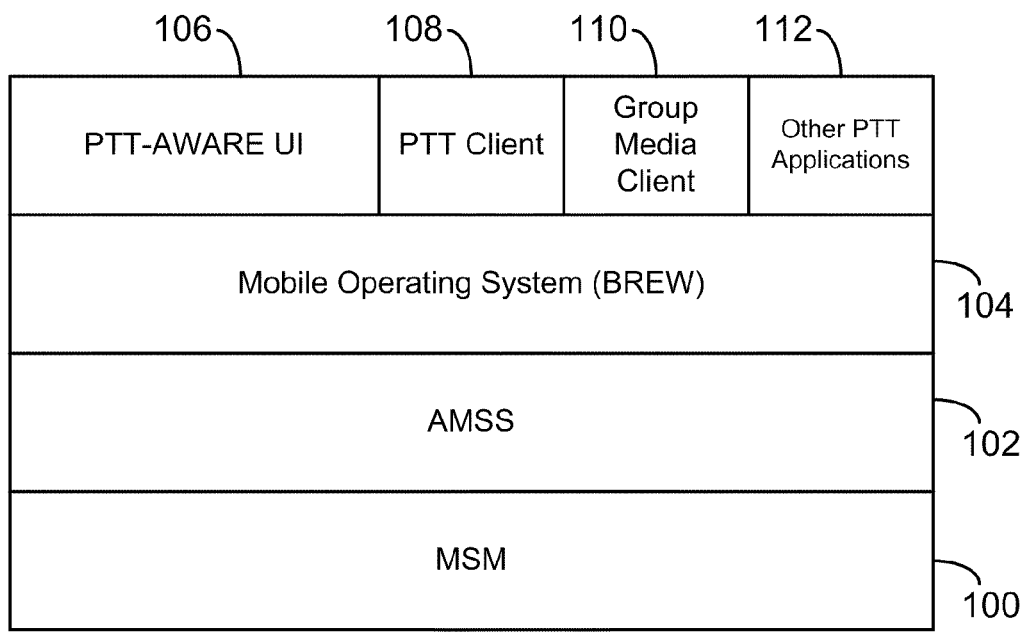
FIG. 4 is a diagram of one embodiment of the software layers of the communication group application, with a PTT client and a group-directed media client.

FIG. 4 is a diagram of one embodiment of the software layers of the group application client, with a PTT facility and a group-directed media facility. In this embodiment, the computer platform 82 in the mobile device environment consists of a series of software "layers" developed on top of the Mobile Station Modem (MSM)100 and the Advanced Mobile Subscriber Software (AMSS) 102, developed by QUALCOMM, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM. The mobile operating system layer 104 application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the Group Media Client 110. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

The Group Media Client 110 is a mobile operating system-based application that extends PTT services for access to media types other than the traditional half duplex voice communications (VoIP-PTT media). The Group Media Client 110 provides access to group-media services through an external interface, in one embodiment being a separate API, such as a Group Media Aware API. The Group Media Aware UI is an application that may be developed entirely as a mobile operating system-based application or used in combination with an AMSS 102 interface. The Group Media Aware UI responds to user requests for group-directed media services by invoking the appropriate APIs, such as those from other resident PTT and group media applications 112. The Group Media Client 110 services the requests from the user and informs the user the result of any group-directed media request. The user can also have setting on the Group Media Client 110, that specify how to handle an incoming notification that indicates there is a file to be downloaded from the file management server (data store 36). For example, the Group Media Client 110 can elect to have the file download commence immediately or to allow the target user to be prompted to determine whether to download the file.

Multimedia Tagging By A Mobile User

Mobile telecommunication devices, such as cellular phones, PDAs, mini-laptops, and advanced pagers typically receive, create, store and transmit various types of information relating to multimedia, documents, contacts, email, and the like. Such information may include image files, audio files, video files, and text files. Such devices typically host a variety of applications such as video and audio applications, image and audio capture applications, and location determination systems such as GPS. The personal electronics devices may also have access to location based services such as searching and mapping functions. Furthermore, with the wide availability of accessible data networks, mobile device users may have ready access to their provider networks and thus all of the data and services available via the Internet and other networks.

Users of mobile devices typically have limited resources for providing a real time user interface that is available for quickly and efficiently sharing information with other users as soon as the user desires or seeks access to the information. For example, users must typically page through numerous screens and scroll through numerous menu choices to find the information or application they are looking for. For example, if a user desires to search for an eatery at their current location, the user may search for and launch a browser application, perform a search for an eatery, scroll through the search results, and read through user reviews to find a suitable eatery. As another example, the user may desire to record and store comments about the eatery and share their comments with their contacts. However, many mobile devices do not have the resources such as the processing power and memory to maintain a store of relevant media, nor the applications and services to readily store or share such information. If a user desires to share information about a particular location or point of interest with a friend, the user and the user's friend typically must both subscribe to an information-sharing service, social networking service, or the like. The user must then access the site using their mobile web browser or other such application, create the content that they want to share or enter the information directly into the web site, and upload the information. The friend must then be notified of the existence of such a comment for the point of interest. If the friend receives the information, for example, as an email, the friend must store the information and remember that the information exists. Alternatively, the friend typically must access the same information sharing web site and access the information.

As indicated by the popularity of social networking applications and sites, a large number of users are participating in various networking groups to connect with friends, family, and other people and to share information. For example, various web sites and services may allow users to contribute reviews of places of business and tag the places of business with notes or comments. Typically a user must manually enter such comments and post them to a review service or web site. Other users must access the site or subscribe to the service, or otherwise search for the information in order to access such user comments. However, it would be desirable to allow for users to easily create and share such information using their mobile devices. For example, it would be advantageous for mobile device users to have the ability to create and share location-tagged voice notes regarding a particular location or point of interest. Furthermore, it would be advantageous if such voice notes may be combined with other media types so that users can share a rich and varied set of information. For example, a user may create a voice note along with a photo image and share both media objects with their mobile communities.

Additionally, it would be advantageous to provide users with the ability to quickly and easily access voice reviews or comments from their friends based on the user's location and whether the user is physically in the vicinity of the point of interest associated with the review or comment. Voice audio can be one effective way of recording reviews and sharing commentaries with friends while traveling about. The use of voice for such purposes may provide a seamless method of sharing information that is consistent and congruous with the use of a mobile device. Thus, for example, a mobile device user may walk past a bakery and automatically be notified that the bakery offers a friend's favorite cookies by being presented with the information in the friend's recorded voice.

In the present disclosure, a point of interest may be any location, place of business, physical object at a location, and the like, for which a user may desire to share a thought, opinion, or otherwise associate with such information. The notion of associating a piece of information with such a geographic location such as a place of interest may be referred to as "geo-tagging," although other terms may be used to refer to the same concept.

It would be advantageous to allow users to not only geo-tag information such as text-based notes, photos, and audio notes, but also to integrate such information with applications on the mobile device. For example, a voice recording application on the mobile device may provide the user with an option to geo-tag a voice recording upon completion of the creation of the recording.

In order to provide a location based service, the geo-tagging application may receive and use location data to determine where the user or the image capture device is located geographically or in reference to the user's surroundings. Furthermore, the point of view of the mobile device may be tracked so that the geo-tagged information may be presented in its proper perspective on the device in the case of a visually rendered media object. For example, the Global Positioning System (GPS) may be used to provide a location of the mobile device. The position and movement of the mobile device may be determined using inertial sensors such as accelerometers, if available.

In various embodiments, a geo-tagging application may incorporate proximity-based triggers to automatically or selectively distribute the geo-tagged media based on a user's position. The triggers may be based, for example, on an approximate distance or radius from a particular geographic point of reference. Such a point of reference may be a street address, intersection, city center, geographic coordinates, and the like. The distance or radius can be any measure of distance and may consider the accuracy of the available location information as well as the type of information. For example, a general comment regarding a town may use a trigger with a large radius (e.g., several miles) from the town center. The triggers may be set by the user as a general setting or as a specific setting for each shared piece of information. The triggers may also be determined by the geo-tagging service provider.

In an embodiment, selected information from a first wireless communication device of a communication group may be associated with a geographic location and stored. The information may be stored locally on the device and transmitted via an available network and stored in an information store provided by a service provider that provides a geo-tagging service or other storage means. For example, the information may be transmitted to a computing device such as a server associated with the communication group. The information may be stored in a data store associated with the communication group. Alternatively, the information may be forwarded to a server and/or data store associated with a geo-tagging service provider. The geo-tagging service may then selectively transmit a portion of the information to a second wireless communication device of the communication group when the second wireless communication device is determined to be proximate to the geographic location.

In a non-limiting example, a mobile user may be present at a point of interest such as a restaurant. The user may press a button on the mobile device and speak a comment or review of the restaurant, whereupon the comment/review may be tagged to the user's geographic location. The comment/review may then be made available to other users of a communication group. The other users may be members of a mobile communications network such as a PTT group or other predefined group. When a second user of the group enters the vicinity of the point of interest, the comment/review may be automatically transmitted to the second user's mobile device and reproduced on the mobile device using an appropriate application.

In an embodiment, the geo-tagging service may store the identity of the user that created/uploaded the comment/review. The geo-tagging service may then prevent the comment/review from being transmitted to the user that created the comment/review when the user re-enters the point of interest associated with the comment/review.

Thus, by providing the ability to create and upload user media based on a trigger such as a geographic location, mobile users may be able to easily share information regarding objects such as landmarks or other places of interest.

The creation and sharing of a voice comment is one example illustration of the presently disclosed subject matter. Many other types of media and data can be created, tagged, and shared. For example, pictures, text, video, music and other media types may be created or selected, tagged, and stored in conjunction with or in lieu of voice notes. Moreover, information other than location data may be tagged with the media. Tag data, such as time of day, date, weather, current traffic conditions, proximity to other locations/points of interest, are but a few examples of information that may be tagged. Such data may provide opportunities to further refine the triggers for providing the data to other users, or otherwise enhance the geo-tagged media sharing experience.

In an embodiment, a user may use an application on a mobile device to create a geo-tagged voice note. The user may, for example, launch a geo-tagging application. The user may then press the PTT button and speak as if the user were communicating with a friend over PTT. Additionally and optionally, the user may take a photo, write a note, capture a video clip, create a music clip, or create some other media "package" and have the package geo-tagged to the user's current location.

When the voice note or other media package is created, the user's device may also provide a geo-tag and/or time stamp. Optionally the device may interact with the network to create the geo-tag and/or time stamp. At this point, the media may be transmitted to a server via the network for further processing or storage. Additional information may be added or tagged to the media and stored. Examples of such added information include weather information when the tag was created.

Once such geo-tagged information is stored, other users or members of a group may be provided or be given access to this information. In an embodiment, users may be provided with passive notification. For example, users, if enabled, may be notified when they are near a location that has been tagged by a friend. The user may view the type of media that was tagged, the person who tagged it, and when it was tagged. Additionally or optionally, the user may be provided with previews or a summary of the available information using thumbnails and the like. The user may select one or more items to view or to access additional details. The user may further be provided an option to instantly view or render the media. Additionally, the user may respond to the existing media by creating their own media response using a supported media format.

As described, a geo-tagging service may store created media and add information to the media. In a further embodiment, geo-tagged user created media may be stored on a network and used to create one or more user profiles. Such information may be used, for example, to build a user profile and determine usage patterns which may be used to provide recommendations to users. Such recommendations may include places to eat, drink, workout, etc. Additionally, the additional information may be used to create a mobile advertising platform. Thus in another embodiment, user profiles may be accessed and analyzed to determine user trends and preferences. Such information may be of tremendous value, for example, to advertisers and marketing agencies. For example, such information may be used to determine and provide offers, recommendations, and coupons/discounts (incentives) to mobile users. In one embodiment, if a user has provided favorable comments for a particular establishment, such information may be used to determine that the user may be interested in other similar establishments. Recommendations may then be generated and provided to the user. Furthermore, such recommendations may be provided as the user enters the general vicinity of the recommended establishment.

Over the course of time, the user responses may accumulate and form geo-based conversations that may be viewable and accessed by the members of a given network or communications group. By way of illustration, a user may visit a city and visit a pub based on a friend's recommendation accessed by a geo-tagging mechanism. The user may then record their own review and upload the review as a tagged comment associated with the same location. Other users of the communications group may contribute their own geo-tagged media associated with the pub. At a later time, the users of the communications group may access and view all media associated with the location as a geo-event or geo-based conversation anchored to the pub's location.

In one embodiment, a user may use an application to search for existing media tags created by members of the user's communications group. For example, a user may search and view tagged media from members of a communications group on a dynamic map. As another example, the user may use a web browser to access and listen to reviews, read comments, or view video clips associated with a geo-based conversation.

In a representative embodiment of the presently disclosed subject matter, a location-based voice-centered system may be provided for exchanging information between devices of a communication group of wireless communication devices, in which metadata may be added to geo-tagged media in real time. Such a system may provide a user interface on the mobile device that provides quick and efficient access to the geo-tagging application. For example, a push of a button, such as a PTT button, may allow the user to record or create a comment regarding a particular location. Members of the communication group may be automatically notified of the user comment when the member enters the general vicinity of the location associated with the comment. For example, a member of the communication group may thus be able to quickly capture feelings regarding a sunset, thoughts on a burger, or admiration for a work of art, and at the push of a button, her friends may have ready access to what she had to say. By thus enabling the creation and sharing of voice-based geo-tagged notes, a new way for mobile users to explore and share their experiences may be provided.

The presently disclosed methods and systems may be used to enhance the mobile user experience in numerous ways. For example, the user created media may be used to augment the images being displayed on a mobile device when the device is being used to view a location using a built-in camera. Such augmented reality applications are but one way that the presently disclose subject matter may enhance the mobile user experience.

In one embodiment, a new media object may be generated by providing a new media creation wizard to facilitate intuitive and efficient creation of new media objects. Such a wizard may provide, for example, a mechanism to select people/contacts and data or media entities/things. The media may also be associated with the current time value. Alternatively, the user may be able to select another time value relative to the current time value. For example, a user may select a person in a contact list and select a time value that may indicate a "now" versus "later" selection.

In a further embodiment, media objects may be created and/or modified via a website and may be uploaded via the internet. For example, a web-based service may provide access to a user account associated with the mobile communication device. The service may authenticate a user and provide the user with various account management functions. The user may further be able to create and modify location-based information using the web service. Various media objects such as voice clips may be created and associated with a point of interest and uploaded to a server for later retrieval by members of the communications group. Once the user has created or modified such information on the website, an over-the-airwaves download may provide the information to the handset using the various techniques disclosed herein, thus being accessed when a member of the group enters the vicinity of the locations associated with the media. One example of where this may be useful is when a group member has returned from a location with numerous digital photos associated with a point of interest. The member may wish to share the photos but may first desire to review the photos and upload only selected photos.

When the mobile device's location and orientation can be determined, a number of additional and useful features and services may be provided to the device. In one embodiment, targeted advertisements that may be relevant to the location and local environment may be downloaded to the device, whereupon the advertisements may be merged, played or displayed on the device along with the geo-tagged media. For example, the database may include advertisement data associated with particular businesses. When a user creates a geo-tagged media object associated with a particular business, the advertisement data may also be provided to a subsequent user that enters the vicinity of the business.

It can be further appreciated that once a device's location and orientation can be determined, any number of services may be provided related to the device's location and orientation. For example, queries may be generated or prompted upon direct input from the user. In an embodiment, when a user clicks on a portion of a rendered map on the mobile device, a geo-tagging application may interpret the user click as a request for additional information about the landmark represented by the selected portion of the rendered map. For example, the user may click on the portion of the map in which a particular business is located. In other embodiments, the user input may represent a push/pull for information regarding the area associated with the user input. Rendering of the received information from the database may be performed through a variety of methods such as a two dimensional overlay, reproduction of a sound file, and the like.

In some embodiments, the audio data captured by the device may be transmitted to the server for additional processing. In other embodiments, the device may perform processing locally and transmit the processed audio data to the server. The device may, for example, comprise hardware and/or software for audio processing and compression and thus save significant bandwidth in transmitting audio data over the network.

In addition to providing metadata as described in the above examples, context specific requests and/or actions may also be delivered to a mobile device. In one embodiment, a mobile device may receive a request to provide the geo-tagging service with a particular piece of information when the device is in a particular region. For example, a group member may request reviews for a particular eatery. The request may be saved on the system, and requests for information may be generated and transmitted by the geo-tagging system when a device enters the vicinity of the eatery. The user comment may then be created, uploaded, transmitted to other members of the group.

It can be appreciated that the above described geo-tagged information may be provided without a user having to actually enter the vicinity of the location associated with the information. Some information may be, as described above, requested by users and thus made available as soon as the requested information is available. Alternatively, some information may be transmitted to all members of a communications group at the request of the user that creates the information.

In some embodiments, the database may comprise predetermined data. The predetermined data may be provided by the service provider. For example, landmarks that are not represented by user comments in the database may be identified, and when a user enters the vicinity of the landmark, the system may invite the user to provide a comment. The term landmark may comprise any point of reference at various granularities. For example, a particular painting in an art gallery may be identified as a landmark for which a user may provide a comment.

In some cases, a location may not be currently known or recognized by the geo-tagging system. For example, a device may be out of range of a coverage area, and other location determination means may not be available. In such cases the user may be allowed to create the media information and tag the information at a later time. Additionally and optionally, the user may be provided an option to manually enter the location, for example entering an intersection, address, or map coordinates.

In some embodiments, the user or an application may choose to associate selected information with a location and make such data available to other users who may enter the area at the same or a different time. Multiple users may associate different information with a single location and allow the data to be accessible to different subsets of users. For example, a user may create a comment and mark the comment for availability to two or more different groups of users. In other embodiments, users may not necessarily share in the same information associated with a particular location. For example, a user may designate that a particular comment is available for one group but not another. Only the designated communication group will then be provided access to the comment.

In some embodiments, a user may create and tag their own location information. For example, a user may tag a comment regarding a new restaurant that is not yet listed in commercially available search databases. The user may enter information about the new restaurant and tag the information with general location information. The new restaurant information may then be made available to the user's communication group when they enter the vicinity of the new restaurant even though the restaurant is not yet listed on available mapping or search databases.

In an embodiment, metadata may be automatically and seamlessly transmitted by the user device to supplement to the user created media. Additionally and optionally, users may be prompted to provide additional information that is associated with the newly created entry.

Furthermore, users may provide additional context sensitive metadata associated with a particular point of interest. For example, a point of interest may present different sets of metadata that may be dependent upon the user's context (a user near a restaurant may be presented with a user's comment when viewed within a mapping application, while a pop-up display may highlight a particular contact when viewed from a contact list).

By enabling the above described data sharing techniques, the members of any type of gaming, social, or other type of communication group may share in the same set of common information about any type of point of interest or location by using their mobile devices.

Those skilled in the art will readily recognize that each particular processing component may be distributed and executed by the user device and servers, data stores, and other components in the network. For example, audio data processing and compression can be handled by the device or by the server.

Figure 5:
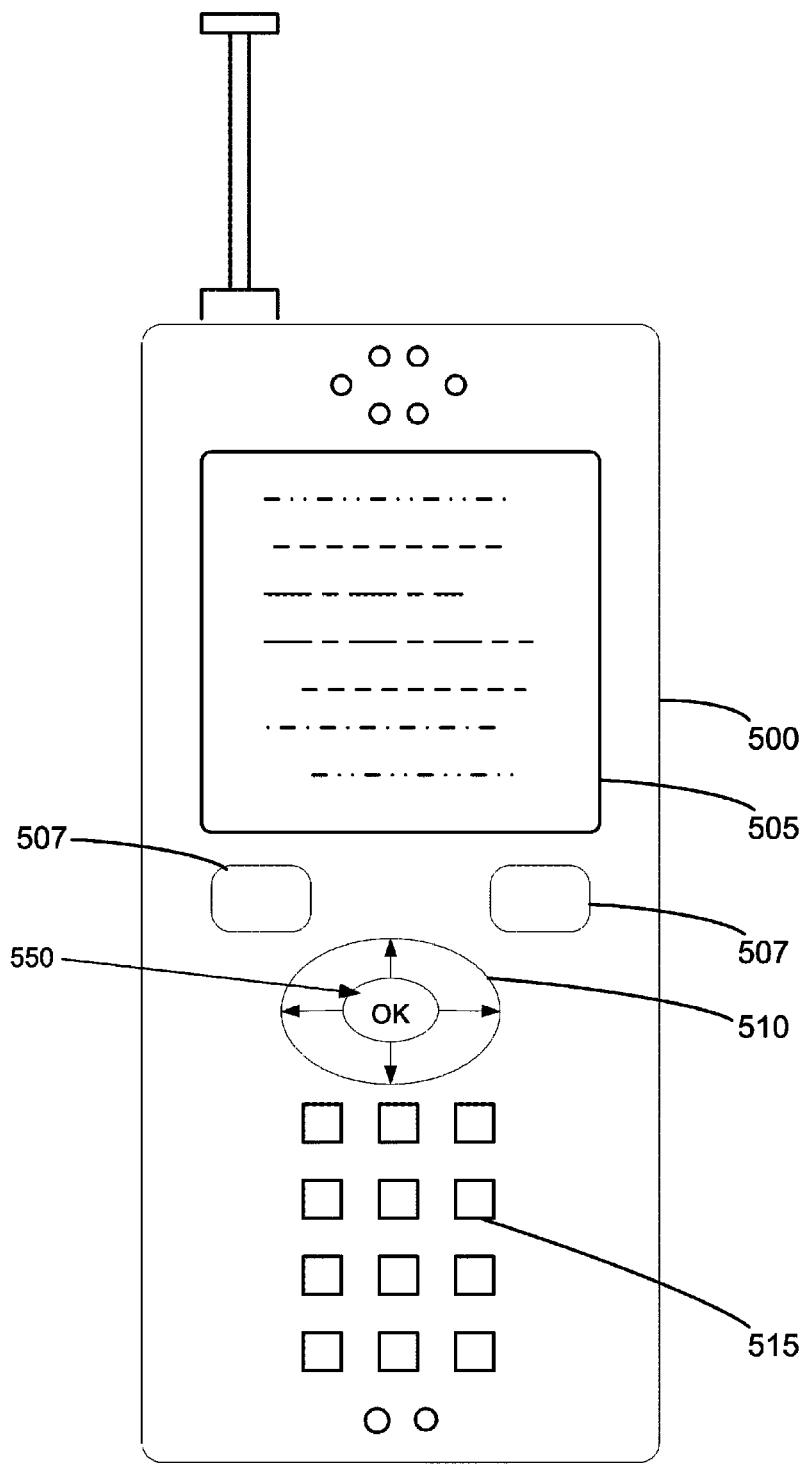
FIG. 5 is an exemplary mobile communications device.

Referring to FIG. 5, illustrated is an exemplary, non-limiting mobile communications device 500 and the user interface for the device. The device typically includes a display 505 that may comprise an LCD or OLED display. In some embodiments, the display may include touch screen capability. The device may include a keypad 515 that may be a standard phone keypad, or in other embodiments a QWERTY keypad. The device may also include navigation buttons 510 that may further comprise up, down, left, and right keys for navigating through the display 505. The navigation keys may further comprise a selection or OK key 550 to indicate the user's selection or acknowledgment of a particular function. The device may also include soft keys 507 that are programmable and used to select the function as indicated in an area of display 505 near the soft key.

A geo-tagging system or related systems and methods may be implemented using a variety of devices and configurations. A system for capturing voice recordings may comprise one or more audio capture devices such as a digital recorder application with an input microphone device. The device may include a digital converter digitizing an analog audio input as well as a communication link. The device may also include a program for processing audio data. Device 500 may be any device capable of implementing the systems and/or methods disclosed herein, such as a smartphone, PDA, or any other device configured to implement a geo-tagging system. Alternatively, device 500 may perform one or more aspects of a geo-tagging system and work in conjunction with one or more other devices to implement a complete geo-tagging system. Device 500 may also be integrated into one or more other devices that are capable of performing other activities beyond implementing a geo-tagging system. Such devices may include a personal data assistant (PDA), a mobile telephone, a laptop or desktop computer, a mobile or stationary gaming system, a camera, or any other device capable of implementing a geo-tagging system and performing at least one other function. All such configurations and devices are contemplated as within the scope of the present disclosure.

A combination of augmented reality and mobile computing technology may be used on mobile device 500. Furthermore, because of the limited processing and available memory on such devices, it may be advantageous for the device to transmit one or more audio files via an accessible data network to a system available via the network. For example, a server may provide storage and data management services for audio data transmitted by the mobile device. The server may also access a database storing media data that may be transmitted to the mobile device. Furthermore, the server, in addition to maintaining a database storing media data for transmission, may also maintain a database storing map data for one or more geographic locations. The server and/or database may operate in conjunction with server 32 and data store 36 of FIG. 1. Alternatively, server 32 and data store 36 may include geo-tagging applications and provide the service in conjunction with other group communications functions.

The mobile device 500 may include a location determination function, such as GPS or cellular based location determination. In an embodiment, the location determination performed by device 500 may be transmitted to a server. The device's location may be determined hierarchically, for example beginning with a coarse location estimate and refining the initial estimate to arrive at a more precise estimate.

Figure 6:
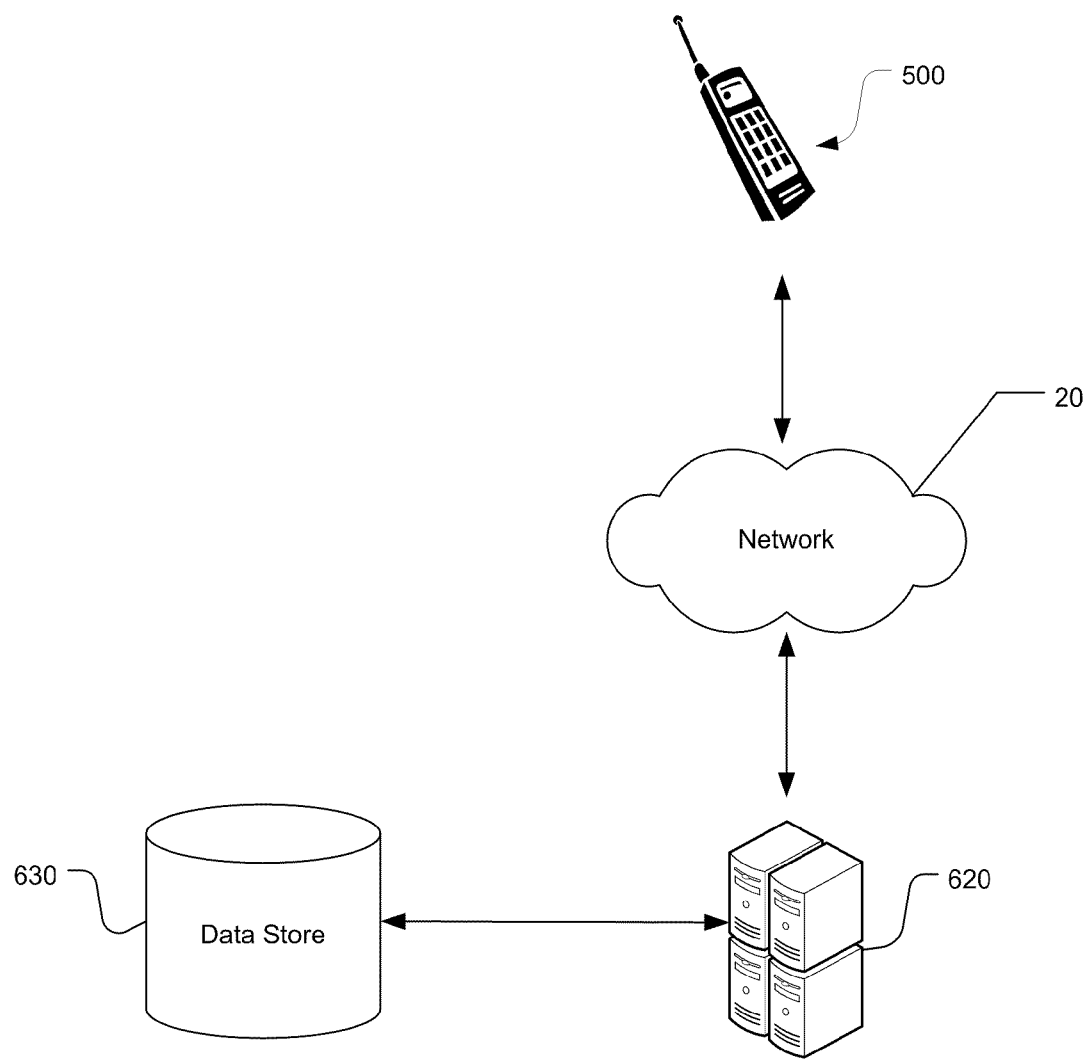
FIG. 6 is an exemplary geo-tagging system.

In one exemplary embodiment illustrated in FIG. 6, a mobile device 500 with one or more media capture capabilities may be configured to capture voice notes. The captured audio files may be transmitted via a wireless network 20 to system 620 that may comprise one or more servers hosting at least one application that receives the transmitted audio files and their associated metadata. Device 500 may further include a location determination capability using GPS or other location determination means, and may transmit the location information along with the audio data. Device 500 may further transmit its location information on a continuous basis to system 620. System 620 may further have access to data store 630 that may comprise a database of media files and related metadata. System 620 may monitor the location of device 500 and may access the data store 630 to determine if there is any stored media files that are associated with the current location of device 500. System 620 may also monitor a number of such media files as mobile device 500 approaches a geographic location. For example, system 620 may request all media files that are associated with locations within a one mile radius of the current location of mobile device 500. When mobile device 500 enters, for example, a 100 meter radius of a location associated with a media file, the media file may be retrieved from data store 630. System 630 may then transmit the retrieved media file and associated metadata to device 500 via network 20, whereupon the device 500 may render the received metadata and/or merge the received metadata with a currently running application.

Figure 7:
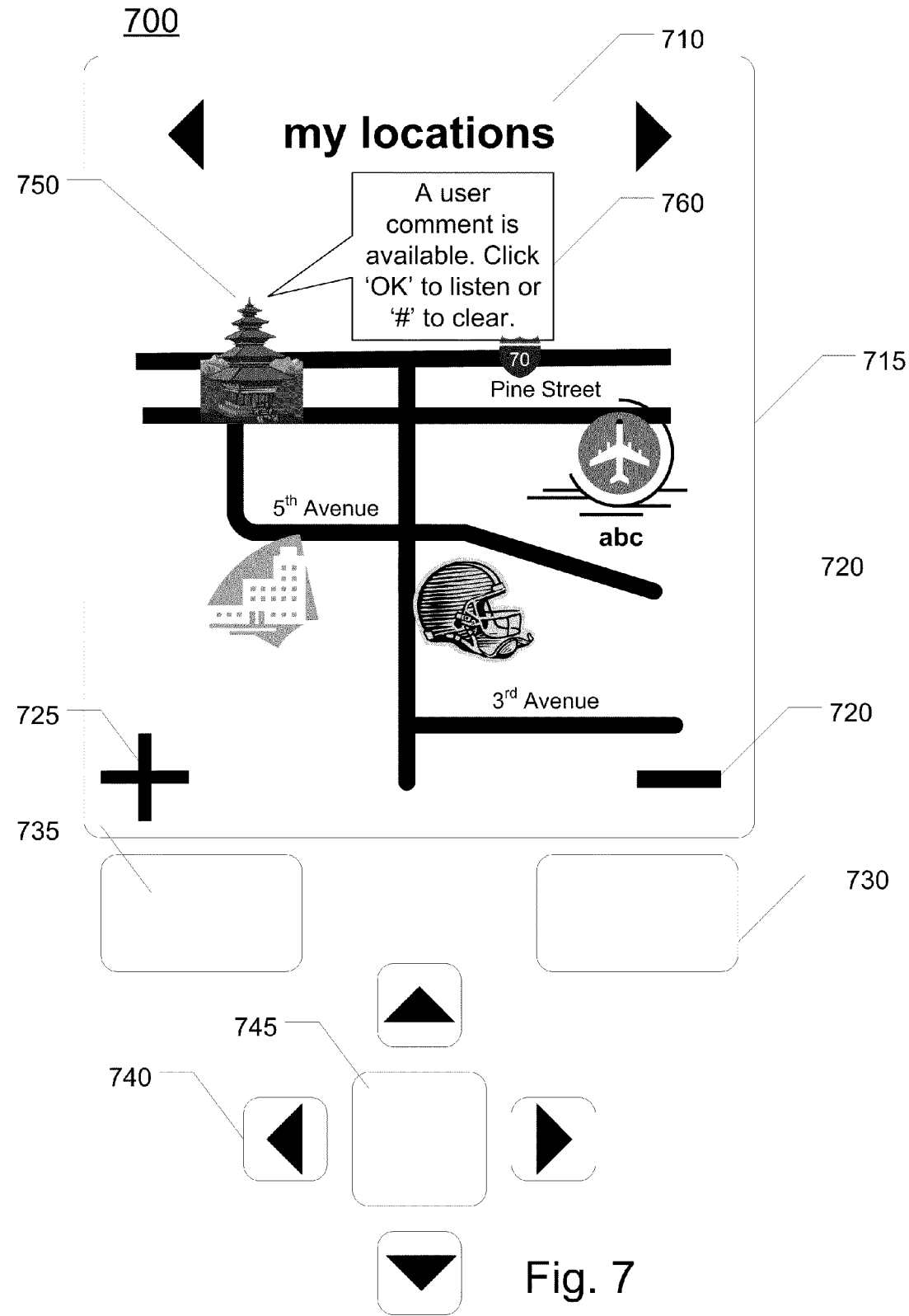
FIG. 7 depicts an exemplary user interface on a mobile communications device incorporating some of the embodiments disclosed herein.

Referring to FIG. 7, illustrated is an exemplary user interface 700 that may be implemented on a mobile communications device, providing a location map comprising personal points of interest and contacts. The display may include a title area 710 that indicates that the current type of user interface currently presented is "my locations." Various location icons 750 may be presented in an approximate spatial or geographic fashion on the display. Other embodiments may use thumbnails or other graphic indicators as desired. Some points of contact 720 may be presented with user IDs or other means of identifying an icon within a limited display area. For example, icon 720 may be identified with a three letter acronym or initials of a contact.

The user may be provided the ability to navigate through the display by selecting the navigation buttons 740. For example, selection of left and right navigation buttons may scroll through different categories of locations such as those limited to a particular geographic range. Navigating with the up and down buttons may move the active display area to upper and lower levels of hierarchy. Further active areas may be provided to indicate whether the current display indicates a particular geographic range, locations related only to contacts, entertainment locations, or other categories. Also provided may be a select or 'OK' button 745 that may indicate a selection by the user.

The user may select to zoom in or out by pressing the "+" or "−" zoom soft keys 725 and 720, upon which closer or farther zooming levels of the geographic features on the map may be provided on the display area 715. When a user presses the "−" zoom out button, the field of view may be expanded to include a larger mapping area. Likewise, if the zoom "+" button is selected, the field of view may zoom in to expand the mapping view. The user's desired points of interest may be represented on the display in accordance with their relative locations on the respective mapping views.

In one embodiment, the display 715 may render a window 760 when a media object or file may be available within the vicinity of the device. In the present example, the user is notified via window 760 that a comment is available. In one embodiment, a geo-tagging service may only provide to the device an indication that a media object or file is available prior to downloading the media object or file. The window 760 may inform the user that the user may click the 'OK' button to listen to the audio file in the present example. Alternatively, the user may press the '#' button to cancel or ignore the window. If the user selects the 'OK' button, the device 500 may transmit an indication to the geo-tagging service that the user would like to listen to the comment. The geo-tagging service may then transmit the audio file to the device 500, whereupon the device 500 may render the audio file using an appropriate application. In other embodiments, the device 500 may provide additional or alternative notifications. For example, in addition to or in lieu of the notification window 760, the device may provide an aural indication or may vibrate. Typically the notification settings may be selected by the user as a general device setting or may be configured for specific applications.

Figure 8:
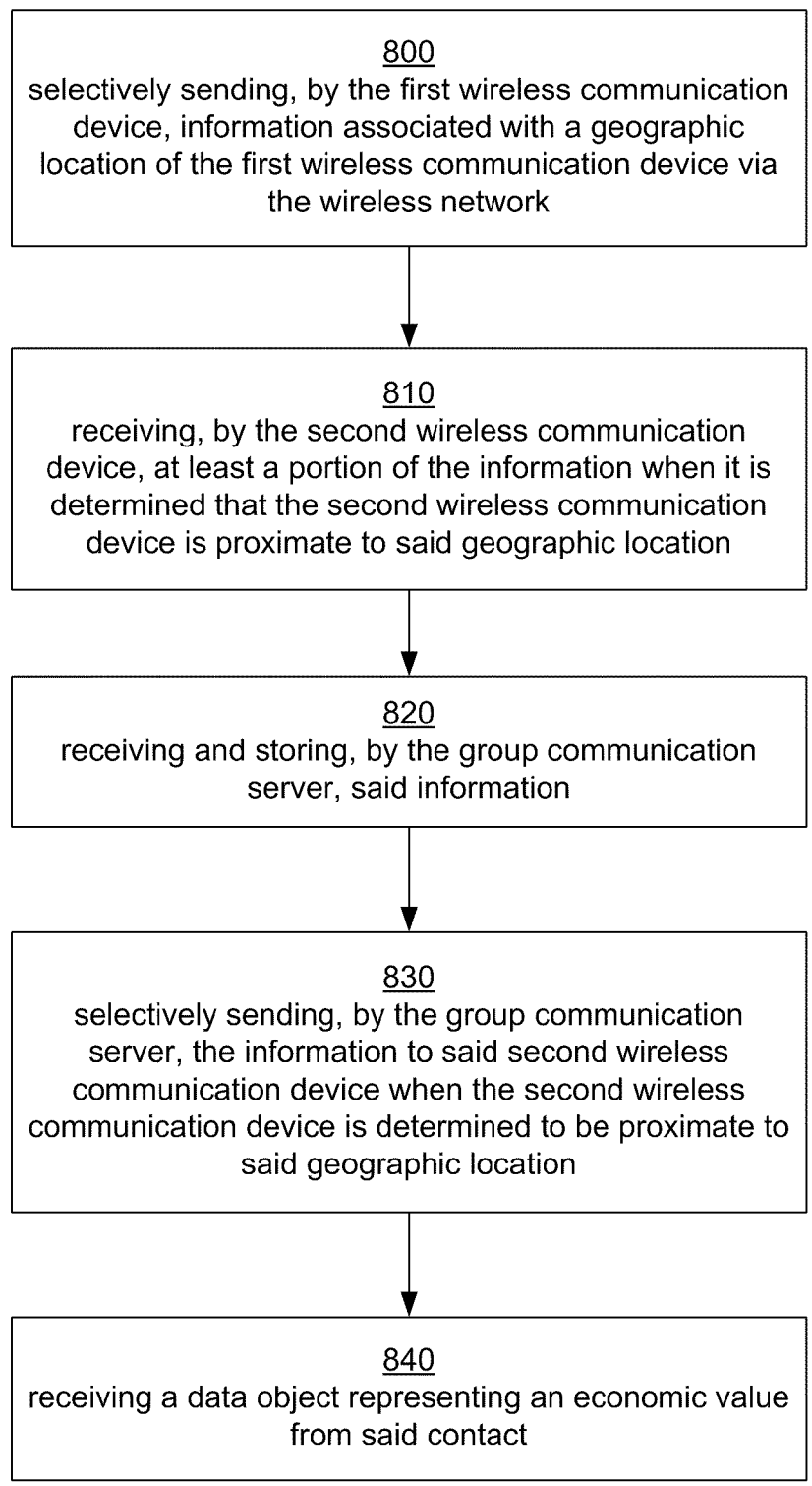
FIG. 8 depicts an exemplary process incorporating some of the embodiments disclosed herein.

Referring now to FIG. 8, illustrated is an exemplary process for exchanging location-based information between devices of a communication group of wireless communication devices including operations 800, 810, 820, and 830. The illustrated operations are exemplary and do not imply a particular order. The device may be a mobile communication devices of a communication group of mobile communication devices that communicate with each other in direct group communications across a wireless communication network. Process 800 illustrates selectively sending, by the first wireless communication device, information associated with a geographic location of the first wireless communication device via the wireless network. The information may be a media entity such as an image file, audio file, and the like. Typically the data will be captured by a capture device on the mobile unit, such as a camera or voice recorder. The data may comprise a single frame or data object, a series of frames or data objects, or a continuous stream such as an audio stream or video stream. The information may be created by the user using an application on the mobile device. Alternatively, the information may be provided by another system for receiving or processing information, in which the system may be associated with the mobile user's account. Alternatively, the inputs may be retrieved from the device's memory if previously created and stored.

The geographic location may be determined using a variety of methods including Global Navigation Satellite System (GNSS), cellular-based location estimation, and manual data entry. GNSS systems may include any type of satellite navigation system that provides geo-spatial positioning including GPS, GLONASS, Beidou, COMPASS, and Galileo.

The location may be estimated using an initial coarse estimation of the location to determine an initial set of information that may be relevant to the coarse location estimate. In an embodiment the magnitude of the initial search radius may be determined by the information source used for the first location estimate. For example, if the first location estimate was determined using GPS, the search radius may be ten to thirty meters. If the first location estimate was determined using cellular based techniques, the search radius may be hundreds or thousands of meters. However, in some embodiments the magnitude of an initial search radius may be determined using factors other than the range or accuracy of the information source. For example, in the case of GPS, although the range of accuracy may be ten to thirty meters, the GPS may not operate indoors. In this case, a GPS-equipped mobile device in an unknown environment may, for example, send the server the GPS coordinates it last acquired when it was outdoors. The server may then consider areas near those GPS coordinates yet beyond the range of GPS accuracy in attempting to search for relevant information.

In some embodiments a service provider may populate a database with media objects for popular points of interest. The pre-populated media objects may be periodically updated by the service provider. In some embodiments a service provider may accept advertisement-like media objects for a fee or on a subscription basis.

In some embodiments the media objects may include images and other media types that are captured or created by users. For example, users may generate text notes, image files, or audio files. The user generated media objects may be associated with a particular landmark or geographic feature. Geo-tagging may be established using an appropriate application on the user device. In some embodiments the association may be made automatically based on the user context. For example, the user may identify a portion of a currently rendered image using a cameraphone application and activate a geo-tagging operation by clicking the OK button or other appropriate means, and the application may launch a context sensitive menu that allows the user to geo-tag the image. Alternatively, the user may navigate to an existing file on the device to associate with the current location. The media object may then be uploaded via an available network. In some embodiments, the media objects may not be associated with a specific landmark but may instead be anchored to a general region.

Access to the information may further be defined by the user and included in metadata transmitted along with the information. Some information may be generally accessible to any other user that has access to the geo-tagging service. Other information may be accessible to identified users or users within an identified group via social networking, communications group, or other services. Furthermore, information may be associated with specific applications such as game applications.

Process 810 illustrates receiving, by the second wireless communication device, at least a portion of the information when it is determined that the second wireless communication device is proximate to said geographic location.

Process 820 illustrates receiving and storing, by the group communication server, said information.

Process 830 illustrates selectively sending, by the group communication server, the information to said second wireless communication device when the second wireless communication device is determined to be proximate to said geographic location.

Figure 9:
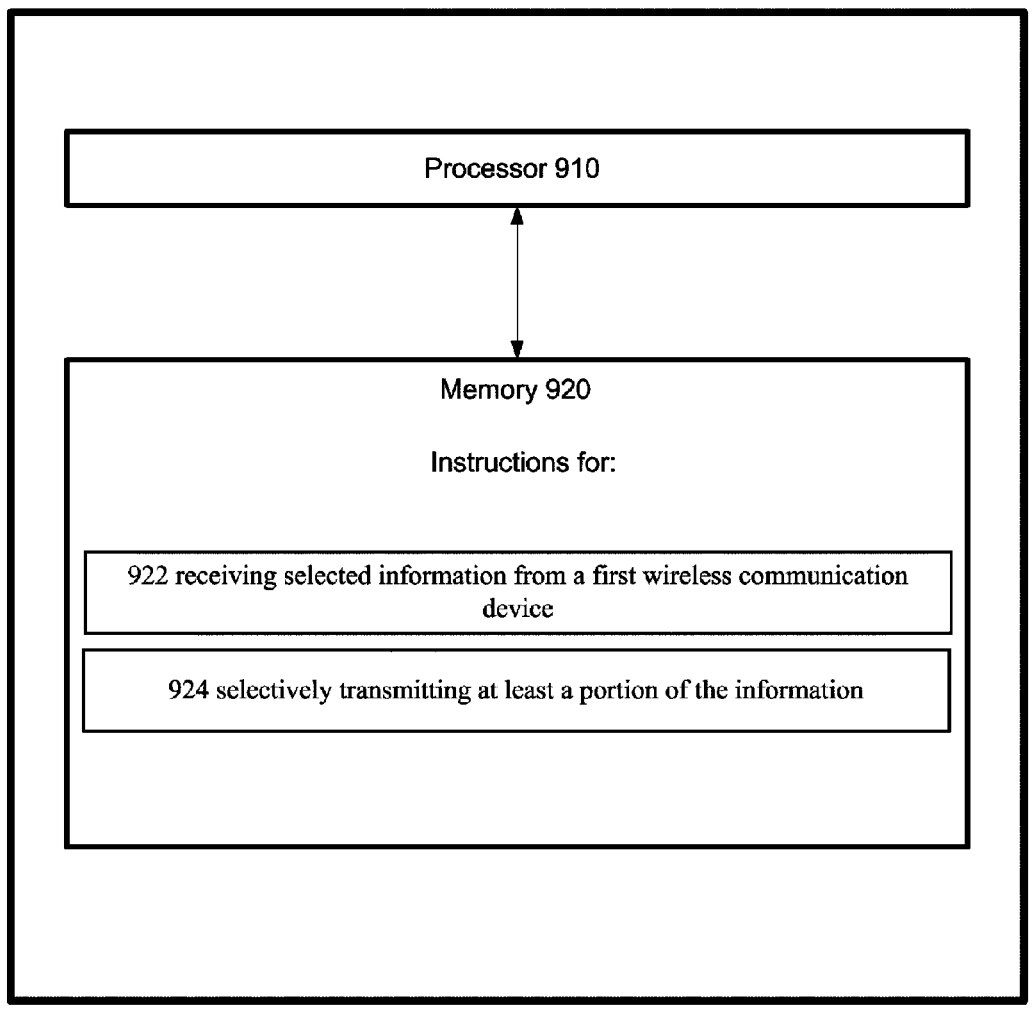
FIG. 9 depicts example system for geo-tagging data.

FIG. 9 depicts an exemplary system for exchanging location-based information between devices of a communication group of wireless communication devices communicatively coupled to a group communication server via a wireless network. Referring to FIG. 9, system 900 comprises a process 910 and memory 920. Memory 920 further comprises computer instructions for exchanging location-based information between devices of a communication group of wireless communication devices. Block 922 illustrates receiving selected information from a first wireless communication device of said communication group, the selected information associated with a geographic location. The information may comprise a plurality of media entities, and may be associated with a geographic location. Block 924 illustrates selectively transmitting at least a portion of the information to a second wireless communication device of said communication group when the second wireless communication device is determined to be proximate to said geographic location.

Any of the above mentioned aspects can be implemented in methods, systems, non-transitory computer readable media, or any type of manufacture. For example, per FIG. 10, a non-transitory computer readable medium can store thereon computer executable instructions for exchanging location-based information between devices of a communication group of wireless communication devices. Such non-transitory media can comprise a first subset of instructions for selectively sending first information associated with a first geographic location of a mobile communication device to a group communication server via a wireless network 1010; and a second subset of instructions for receiving second information from the group communication server when it is determined that the mobile communications device is proximate to a second geographic location, wherein the second information is selected by a source wireless communication device of said communication group when the source wireless communication device is proximate to the second geographic location 1012. It will be appreciated by those skilled in the art that additional sets of instructions can be used to capture the various other aspects disclosed herein, and that the presently disclosed subsets of instructions can vary in detail per the present disclosure.

In view of the methods being executable on a mobile device and other computer platforms, the method can accordingly be performed by a program resident in a non-transitory computer readable medium, where the program directs the mobile device or other computer device having a computer platform to perform the steps of the method. The non-transitory computer readable medium can be the memory of the server, or can be in a connective database. Further, the non-transitory computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored as one or more instructions or code on a non-transitory computer-readable medium. Non-transitory computer-readable media includes computer storage media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A system server for exchanging location-based information between devices of a communication group of wireless communication devices, the system server system comprising:
   at least one processor;
   a data store, and;
   at least one memory communicatively coupled to said at least one processor, the memory having stored therein computer-executable instructions that, when executed, cause the server to perform operations comprising:
      receiving a group communication over a half-duplex communication channel from a first wireless communication device of said communication group;
      storing the received group communication in association with a geographic location; and
      selectively transmitting the group communication to a second wireless communication device of said communication group and automatically notifying a user of the second wireless communication device based on a trigger, the trigger including proximity of the second wireless device to said geographic location and at least one of a time of day, a date, weather conditions, traffic conditions and proximity to other locations.

2. The server of claim 1, wherein said selectively transmitting comprises automatically transmitting the group communication to the second wireless communication device when the second wireless communication device is determined to be proximate to said geographic location.

3. The server of claim 1, further comprising receiving a second group communication from the second wireless communication device, the second group communication associated with said geographic location.

4. The server of claim 1, wherein said selectively transmitting comprises transmitting the group communication in response to receiving an indication from the second wireless communication device.

5. The server of claim 4, further comprising transmitting a summary of said group communication to the second wireless communication device.

6. The server of claim 4, wherein said group communication corresponds to a user selection indicated by said indication.

7. The server of claim 1, wherein said group communication comprises a real-time voice or video communication and at least one of an audio file, a text file, and an image file.

8. The server of claim 1, wherein said group communication is accessible and searchable outside of the communication group.

9. The server of claim 1, wherein the communication group is a Push-To-Talk (PTT) group.

10. The server of claim 1, wherein said group communication comprises at least one of a time of day, a date, weather conditions, traffic conditions, and proximity to other locations.

11. The server of claim 1, wherein said group communication is augmented with third party information prior to transmitting the group communication.

12. The server of claim 1, further comprising analyzing said group communication to determine user trends.

13. A mobile communications device comprising:
   a processor;
   at least one memory communicatively coupled to said processor; and
   a communications interface configured to communicate with a wireless network, the device configured to participate in a communication group of wireless communication devices, the memory having stored therein computer-executable instructions that, when executed, cause the device to perform operations comprising:
      sending a first group communication in association with a first geographic location of said mobile communication device over a half-duplex communication channel to a group communication server via the wireless network; and
      receiving a stored second group communication from the group communication server and automatically notifying a user of said mobile communication device based on a trigger, the trigger including proximity of said mobile communication device to a second geographic location and at least one of a time of day, a date, weather conditions, traffic conditions and proximity to other locations, wherein the second group communication is generated by a source wireless communication device of said communication group when the source wireless communication device is proximate to the second geographic location.

14. The device of claim 13, wherein said receiving comprises automatically receiving the stored second group communication when the device is determined to be proximate to said second geographic location.

15. The device of claim 13, wherein said receiving comprises receiving the stored second group communication in response to receiving an indication from the device.

16. The device of claim 15, further comprising receiving a summary of said stored second group communication.

17. The device of claim 15, wherein said stored second group communication corresponds to a user selection indicated by said indication.

18. The device of claim 13, wherein said first and second group communications comprise a real-time voice or video communication and at least one of an audio file, a text file, and an image file.

19. The device of claim 13, wherein said first and second group communications are accessible and searchable outside of the communication group.

20. The device of claim 13, wherein the communication group is a Push-To-Talk (PTT) group.

21. The device of claim 13, wherein said first and second group communications comprise at least one of a time of day, a date, weather conditions, traffic conditions, and proximity to other locations.

22. The device of claim 13, wherein said stored second group communication is augmented with third party information prior to transmitting the stored second group communication.

23. A system for exchanging location-based information between devices of a communication group of wireless communication devices communicatively coupled to a group communication server via a wireless network, the system comprising:
   a first wireless communication device of said communication group, configured to selectively send a group communication in association with a geographic location of said first wireless communication device over a half-duplex communication channel via the wireless network;
a second wireless communication device of said communication group, configured to automatically receive the group communication and notify a user of said second wireless communication device based on a predefined trigger, the trigger including proximity of the second wireless device to said geographic location and at least one of a time of day, a date, weather conditions, traffic conditions and proximity to other locations; and
a group communication server configured to:
receive and store the group communication, and
selectively send the group communication to said second wireless communication device when the second wireless communication device is determined to be proximate to said geographic location.

24. A server for exchanging location-based information between devices of a communication group of wireless communication devices, comprising:
means for receiving a group communication over a half-duplex communication channel from a first wireless communication device of said communication group;
means for storing the received group communication in association with a geographic location; and
means for selectively transmitting the group communication to a second wireless communication device of said communication group and automatically notifying a user of the second wireless communication device based on a trigger, the trigger including proximity of the second wireless device to said geographic location and at least one of a time of day, a date, weather conditions, traffic conditions and proximity to other locations.

25. The server of claim 24, wherein said means for selectively transmitting comprises means for automatically transmitting the group communication to the second wireless communication device when the second wireless communication device is determined to be proximate to said geographic location.

26. The server of claim 24, further comprising means for receiving a second group communication from the second wireless communication device, the second group communication associated with said geographic location.

27. The server of claim 24, wherein said means for selectively transmitting comprises means for transmitting the group communication in response to receiving an indication from the second wireless communication device.

28. The server of claim 27, further comprising transmitting a summary of said group communication to the second wireless communication device.

29. The server of claim 27, wherein said group communication corresponds to a user selection indicated by said indication.

30. The server of claim 24, wherein said group communication comprises a real-time voice or video communication and at least one of an audio file, a text file, and an image file.

31. The server of claim 24, wherein said group communication is accessible and searchable outside of the communication group.

32. The server of claim 24, wherein the communication group is a Push-To-Talk (PTT) group.

33. The server of claim 24, wherein said group communication comprises at least one of a time of day, a date, weather conditions, traffic conditions, and proximity to other locations.

34. The server of claim 24, wherein said group communication is augmented with third party information prior to transmitting the information.

35. A mobile communications device configured to participate in a communication group of wireless communication devices, further comprising:
means for sending a first group communication in association with a first geographic location of said mobile communication device to a group communication server over a half-duplex communication channel via the wireless network; and
means for receiving a stored second group communication from the group communication server and means for automatically notifying a user of the mobile communications device based on a trigger, the trigger including proximity of the mobile wireless device to a second geographic location and at least one of a time of day, a date, weather conditions, traffic conditions and proximity to other locations, wherein the second group communication is generated by a source wireless communication device of said communication group when the source wireless communication device is proximate to said second geographic location.

36. The device of claim 35, wherein said means for receiving comprises means for automatically receiving the stored second group communication when the device is determined to be proximate to said second geographic location.

37. The device of claim 35, wherein said means for receiving comprises means for receiving the stored second group communication in response to receiving an indication from the device.

38. The device of claim 37, further comprising means for receiving a summary of said stored second group communication.

39. The device of claim 37, wherein said stored second group communication corresponds to a user selection indicated by said indication.

40. The device of claim 37, wherein said first and second group communications comprise a real-time voice or video communication and at least one of an audio file, a text file, and an image file.

41. The device of claim 37, wherein said first and second group communications are accessible and searchable outside of the communication group.

42. The device of claim 37, wherein the communication group is a Push-To-Talk (PTT) group.

43. The device of claim 37, wherein said first and second group communications comprise at least one of a time of day, a date, weather conditions, traffic conditions, and proximity to other locations.

44. The device of claim 37, wherein said second group communication is augmented with third party information prior to transmitting the second group communication.

45. A non-transitory computer-readable storage medium having stored thereon processor-executable instructions configured to cause a processor to exchange location-based information between devices of a communication group of wireless communication devices by performing operations comprising:
receiving a group communication over a half-duplex communication channel from a first wireless communication device of said communication group;
storing the received group communication in association with a geographic location; and
selectively transmitting the group communication to a second wireless communication device of said communication group and automatically notifying a user of the second wireless communication device based on a trigger, the trigger including proximity of the second wireless device to said geographic location and at least one of a time of day, a date, weather conditions, traffic conditions and proximity to other locations.

46. A non-transitory computer-readable storage medium having stored thereon processor-executable instructions configured to cause a processor to exchange location- based information between devices of a communication group of wireless communication devices by performing operations comprising:

sending a first group communication in association with a first geographic location of said mobile communication device over a half-duplex communication channel to a group communication server via the wireless network; and receiving a stored second group communication from the group communication server and automatically notifying a user of said mobile communication device based on a trigger, the trigger including proximity of said mobile communication device to a second geographic location and at least one of a time of day, a date, weather conditions, traffic conditions and proximity to other locations, wherein the second group communication is generated by a source wireless communication device of said communication group when the source wireless communication device is proximate to the second geographic location.

47. In a server comprising at least one processor, a data store, and at least one memory communicatively coupled to said at least one processor, a method for exchanging location-based information between devices of a communication group of wireless communication devices, the method comprising:

receiving a group communication over a half-duplex communication channel from a first wireless communication device of said communication group;

storing the received group communication in association with a geographic location; and selectively transmitting the group communication to a second wireless communication device of said communication group and automatically notifying a user of the second wireless communication device based on a trigger, the trigger including proximity of the second wireless device to said geographic location and at least one of a time of day, a date, weather conditions, traffic conditions and proximity to other locations.

48. In a device comprising a processor, at least one memory communicatively coupled to said processor, and a communications interface configured to communicate with a wireless network wherein the device is configured to participate in a communication group of wireless communication devices, a method for exchanging location based information between devices of a communication group of wireless communication devices, the method comprising:

sending a first group communication in association with a first geographic location of said mobile communication device over a half-duplex communication channel to a group communication server via the wireless network; and receiving a stored second group communication from the group communication server and automatically notifying a user of said mobile communication device based on a trigger, the trigger including proximity of said mobile communication device to a second geographic location and at least one of a time of day, a date, weather conditions, traffic conditions and proximity to other locations, wherein the second group communication is generated by a source wireless communication device of said communication group when the source wireless communication device is proximate to the second geographic location.

49. In a system comprising a first wireless communication device of a communication group of wireless communication devices communicatively coupled to a group communication server via a wireless network, a second wireless communication device of said communication group, and a group communication server, a method for exchanging location based information between the devices, the method comprising:

selectively sending, by the first wireless communication device, a group communication in association with a geographic location of said first wireless communication device over a half-duplex communication channel via the wireless network;

receiving, by the second wireless communication device, the group communication and automatically notifying a user of said second mobile communication device based on a trigger, the trigger including proximity of said second mobile communication device to a second geographic location and at least one of a time of day, a date, weather conditions, traffic conditions and proximity to other locations;

receiving and storing, by the group communication server, said group communication; and selectively sending, by the group communication server, the group communication to said second wireless communication device when the second wireless communication device is determined to be proximate to said geographic location.

* * * * *